(12) United States Patent  
Kuchler et al.

(10) Patent No.: US 8,909,420 B2
(45) Date of Patent: Dec. 9, 2014

(54) TIRE FILLING ASSISTANT

(75) Inventors: Gregor Kuchler, Regensburg (DE); Frank Fischer, Regensburg (DE); Juergen Spotka, Regenstauf (DE)

(73) Assignee: Continental Automotive GmbH, Hannover (DE)

( * ) Notice: Subject to any disclaimer, the term of this patent is extended or adjusted under 35 U.S.C. 154(b) by 205 days.

(21) Appl. No.: 13/516,790

(22) PCT Filed: Dec. 9, 2010

(86) PCT No.: PCT/EP2010/069234
§ 371 (c)(1),
(2), (4) Date: Jun. 18, 2012

(87) PCT Pub. No.: WO2011/073072
PCT Pub. Date: Jun. 23, 2011

(65) Prior Publication Data
US 2012/0259511 A1    Oct. 11, 2012

(30) Foreign Application Priority Data

Dec. 18, 2009  (DE) .......................... 10 2009 058 881

(51) Int. Cl.
*G06F 7/00* (2006.01)
*B60C 23/04* (2006.01)
(52) U.S. Cl.
CPC ......... *B60C 23/0408* (2013.01); *B60C 23/0406* (2013.01); *B60C 23/0401* (2013.01)
USPC .......... 701/36; 701/29.1; 701/29.2; 701/34.4; 340/442; 73/146.2

(58) Field of Classification Search
USPC .......... 701/1, 36, 29.1, 29.2, 29.4, 31.9, 34.4; 340/442, 438, 691.6; 73/146, 146.2, 73/146.3
See application file for complete search history.

(56) References Cited

U.S. PATENT DOCUMENTS

| 5,517,853 | A | 5/1996 | Chamussy |
| 6,612,165 | B2 | 9/2003 | Juzswik et al. |
| 6,997,048 | B2 | 2/2006 | Komatsu et al. |
| 7,024,318 | B2 | 4/2006 | Fischer et al. |
| 7,032,443 | B2 * | 4/2006 | Moser .......................... 73/146.5 |
| 7,528,705 | B2 | 5/2009 | Brown, Jr. et al. |
| 2003/0128109 | A1 | 7/2003 | Andou et al. |
| 2003/0164759 | A1 | 9/2003 | Nantz et al. |
| 2004/0099055 | A1 | 5/2004 | Komatsu et al. |

(Continued)

FOREIGN PATENT DOCUMENTS

DE    37 08 677 A1    11/1988
DE    42 24 498 C1    1/1994

(Continued)

*Primary Examiner* — Rami Khatib
(74) *Attorney, Agent, or Firm* — Laurence A. Greenberg; Werner H. Stemer; Ralph E. Locher

(57) ABSTRACT

A system for monitoring a fill level of a plurality of tires of a vehicle includes a situation detecting unit set up for detecting a situation in which adaptation of a fill level of at least one of the tires of the vehicle is expected. The system further includes a fill level adaptation assistant set up for autonomously assisting a user of the vehicle during the adaptation of the fill level of the at least one tire when the situation is detected.

17 Claims, 4 Drawing Sheets

(56) References Cited

U.S. PATENT DOCUMENTS

2005/0160805 A1 7/2005 Taki
2006/0180256 A1* 8/2006 Mittal .................... 152/416
2007/0186634 A1* 8/2007 Burghardt et al. .............. 73/146

FOREIGN PATENT DOCUMENTS

| | | |
|---|---|---|
| DE | 694 02 451 T2 | 10/1997 |
| DE | 196 50 687 A1 | 6/1998 |
| DE | 101 44 359 A1 | 4/2003 |
| DE | 103 00 022 A1 | 8/2003 |
| DE | 103 07 296 A1 | 9/2003 |
| DE | 10 2004 022 930 A1 | 12/2004 |
| DE | 602 02 744 T2 | 12/2005 |
| JP | 61129144 U | 8/1986 |
| JP | 2004168185 A | 6/2004 |
| JP | 2004338594 A | 12/2004 |
| JP | 2008018937 A | 1/2008 |

* cited by examiner

TIRE FILLING ASSISTANT

BACKGROUND OF THE INVENTION

Field of the Invention:

The invention relates to an apparatus for monitoring a filling level of a plurality of tires of a vehicle.

The invention also relates to a vehicle.

The invention also relates to a method for monitoring a filling level of a plurality of tires of a vehicle.

In addition, the invention relates to a program element.

The invention also relates to a computer-readable storage medium.

Modern motor vehicles form complex systems of hardware and software. A large number of a wide variety of control devices are used to regulate and control the mechatronic system of the automobile. Intelligent tire systems also integrate sensors and the consideration of corresponding sensor data in the operation of a motor vehicle and also measure the tire pressure, for example.

Conventional tire pressure control systems make the driver aware of underfilled tires. When filling the tire, the driver is reliant on external aids and measuring devices.

BRIEF SUMMARY OF THE INVENTION

The invention is based on the object of providing a tire system in which a driver can monitor the tire pressure of a vehicle with a high level of operator comfort and in a robust manner with respect to errors.

This object is achieved by the subject matters of the independent patent claims. Advantageous embodiments of the present invention are described in the dependent claims.

A first aspect of the invention provides an apparatus for monitoring a filling level of a plurality of tires of a vehicle, which apparatus has a situation detection unit which is set up to detect a situation in which adaptation of the filling level of at least one of the tires of the vehicle can be expected. The apparatus also has a filling level adaptation assistant which is set up to automatically assist a user of the vehicle during adaptation of the filling level of the at least one tire when the presence of the situation is detected.

Another exemplary embodiment of the invention provides a vehicle (for example a motor vehicle, in particular a passenger motor vehicle or a truck or a motorcycle) having an apparatus with the abovementioned features for monitoring a filling level of a plurality of tires of the vehicle.

A further exemplary embodiment of the invention provides a method for monitoring a filling level of a plurality of tires of a vehicle. In the method, a situation in which adaptation of a filling level of at least one of the tires of the vehicle can be expected is detected. Furthermore, a user of the vehicle is automatically assisted during adaptation of the filling level of the at least one tire when the presence of the situation is detected.

A computer-readable storage medium according to one exemplary embodiment of the present invention stores a program for monitoring a filling level of a plurality of tires of a vehicle, which program is set up to carry out or control the method with the features described above when it is executed by a processor.

A program element (computer program element) according to one exemplary embodiment of the present invention has the method steps described above (or controls or carries out the latter) when it is executed.

Exemplary embodiments of the present invention can be implemented both using a computer program, that is to say software, and using one or more special electrical circuits, that is to say hardware, or in any desired hybrid form, that is to say using software components and hardware components.

According to one exemplary embodiment, a user, for example a driver of a vehicle, can be assisted with filling a tire or a plurality of tires of the vehicle with additional compressed air or letting out excess compressed air from the tire(s). For this purpose, the vehicle electronics contain, for example, a situation detection unit which has the ability to determine, on the basis of one or more decision-making criteria, a situation in which it can be assumed, with a sufficiently high degree of probability, that the filling level of a tire or of a plurality of the tires will be adapted by the user. If such a filling or emptying situation has been determined with a sufficient degree of probability, for example indicated by means of a sufficient criteria match to the present scenario, a filling level adaptation assistant can be activated. The filling level adaptation assistant accompanies the user during the filling and/or emptying operation and thereby intuitively guides the user, in a robust manner with respect to errors, through a technically sophisticated environment without the need for additional external aids (apart from a compressed air supply and removal unit).

Further refinements of the apparatus are described below. These also apply to the vehicle, to the method, to the program element and to the computer-readable storage medium.

The situation detection unit and the filling level adaptation assistant may be components of vehicle electronics. In other words, the assistance function can be provided solely by the vehicle electronics without the need for external aids. This provides an autonomous system which can be used to facilitate the filling and/or emptying operation for a user.

The situation detection unit may be set up to detect a filling or emptying situation if one or more of the following criteria or other criteria are met. For example, the unlocking of a tank flap by a user can be detected using sensors and can be assessed as an indication that the user has arrived at a filling station. Since the infrastructure for filling and/or emptying tires is usually provided at a filling station, there is a good probability that adaptation of the filling level of the tire can also be expected shortly after the tank flap has been unlocked. Another criterion may be the detection of the switching-off of the vehicle, in particular the switching-off of the engine of the vehicle after the user of the vehicle has previously been informed that the filling level of at least one of the tires should be adapted (that is to say the tire pressure should be increased or decreased). If the vehicle electronics have thus informed a user, for example by means of an optical or acoustic indication, that the tire pressure should be increased or decreased for one or more tires, for example, this can be considered to be an indication or criterion that a filling level of a tire should now be adapted. Yet another criterion may be the detection of the switching-off of the vehicle at a filling station. This may be detected, for example, using sensors, for example by means of a navigation system or an optical sensor which can detect an optical marker at such a filling station. The detection of switching-off of the vehicle after a fuel level in a tank of the vehicle has fallen below a preset threshold value, for example when a reserve fill level has been undershot, can also be considered to be such a criterion.

The situation detection unit may be set up to activate the filling level adaptation assistant when the situation is detected. In other words, the filling level adaptation assistant, which is also a power consumer or an energy consumer in the vehicle, can be kept in a deactivated state or sleep state until a situation has occurred, with a sufficiently high degree of probability, in which the filling level adaptation assistant is intended to assist a user during a filling change process.

The filling level adaptation assistant may be set up to increase a repetition interval for detecting a tire pressure of at least one of the tires when the presence of the situation is detected. Since, during expected filling and/or emptying, a considerably faster change in the tire pressure over time than over normal operation of a motor vehicle can be expected, such a repetition interval can be reduced from hours or days to seconds or less, for example. As a result, the current pressure can be indicated to the user with a high time resolution during the actual changing of the fill level.

In such an exemplary embodiment, the practice of adapting measurement or transmission frequencies in a manner appropriate to the situation may require a special device or intelligence in the wheel/tire module (which is conventionally not particularly intelligent for example). One strategy is for the wheel module to measure the pressure every 1 s to 20 s (that is to say relatively frequently), for example, even if transmission is ultimately effected only once per minute (that is to say relatively rarely). Such oversampling of the pressure information results in it being possible to detect pressure changes at a correspondingly earlier time. Such a function can also be used to be able to detect spontaneous pressure loss scenarios (for example a tire is pierced by a foreign body during the journey) as quickly as possible in order to then change from regular transmission at a transmission frequency to regular transmission at an increased transmission frequency. Within the scope of the described exemplary embodiment of the invention, such a function can be used in such a manner that the pressure is monitored at an increased measuring frequency (but without a transmission frequency or at a very reduced transmission frequency), in particular for a certain amount of time after changing from driving to parking. If the sensor detects a spontaneous pressure rise or fall (in particular a pressure rise or fall which exceeds a predefinable threshold value) in this time, transmission can be commenced at an accordingly increased frequency, for example 20 to 180 times a second, preferably 60 times a second. If there are stable pressure values for a certain amount of time, the transmitter returns to the increased measuring interval with no transmission or very reduced transmission. After a further predetermined time has elapsed, the sensor then changes entirely into a parking mode from which the sensor wakes again, for example, as a result of the movement at the start of the next journey.

The filling level adaptation assistant may be, for example, in the form of a vehicle component which, owing to a lack of bidirectional communication with the wheel/tire module, is not able to inform the affected transmitter of the desired increase in the transmission frequency. In such a scenario, it is therefore advantageous if the filling level adaptation assistant also comprises a component which acts as a software module in the sensor and automatically adapts the transmission frequency when particular pressure changes are present in order to make it possible for a vehicle part of the filling level adaptation assistant to then process/display the data which are now present with an increased repetition frequency.

The filling level adaptation assistant may be set up to indicate to the user whether filling or emptying should be continued for a particular tire or whether filling should be concluded when the presence of the situation is detected. Such an indication may be optically and/or acoustically effected, for example.

In particular, the apparatus may have a man-machine interface (for example a graphical display unit, optionally with an input unit for the inputting of instructions by the user) which is set up to indicate an item of assistance information from the filling level adaptation assistant to the user. For example, a liquid crystal display which can indicate to the user whether a current tire pressure is too high or too low or is exactly right may be provided on each tire. A common man-machine interface which accordingly informs the user in an optical and/or acoustic manner may also be centrally provided.

According to one exemplary embodiment, the filling level adaptation assistant may be set up to drive and thus use a vehicle resource to indicate an item of assistance information from the filling level adaptation assistant to the user. For example, a passenger compartment lighting system which is present anyway can be used to indicate a fill level. For example, normal flashing may indicate filling, continuous illumination may indicate an acceptable filling level and faster flashing at a higher flashing frequency may indicate overfilling. A sound system may also be alternatively or additionally used by virtue of the fact that, for example, beeping noises can be used to indicate filling, a continuous noise can be used to indicate sufficient filling and faster beeping can be used to indicate overfilling. The resources mentioned or other resources (for example also external lighting of the motor vehicle) can thus be synergistically concomitantly used to make filling intuitive and simple for a user without additional technical complexity.

The apparatus may have a filling sequence prediction unit which may be set up to predict a probable filling sequence and to transmit this sequence to the filling level adaptation assistant as the basis for assistance. In other words, the filling sequence prediction unit may use one or more criteria according to which the present user or an average user usually acts in order to carry out filling. Examples of criteria which can be used for this purpose are the fact that the start of the filling sequence begins at a tire spatially closest to a driver's door of the vehicle. This is usually the tire at the front left. A user will often choose this tire first in order to carry out filling. If, however, the user has previously been informed that a very particular, different tire needs to be filled, the probability of the user first of all filling or emptying this critical tire and only then turning to other tires is high. Alternatively or additionally, it can be assumed that the filling sequence is carried out in the clockwise direction of the vehicle. This is a conventional action by users. Yet another criterion is the fact that the filling sequence can be carried out in accordance with one or more filling sequences carried out by the user in the past. For example, the system may record historical data for a particular user and can thus detect habits of a particular user. According to these habits, the system can then adaptively predict a probable filling sequence, which further increases the assistance reliability.

The apparatus may have a filling level detection unit with a plurality of sensors which are arranged on the tires of the vehicle and are set up to determine a tire pressure for each of the tires. This current tire pressure information which may be organized by pressure sensors on the individual tires (or on the corresponding rims) may be used as the basis for assistance.

Additional refinements of the vehicle are described below. These also apply to the apparatus, to the method, to the program element and to the computer-readable storage medium.

The vehicle may be, for example, an automobile (for example a motor vehicle, in particular a passenger motor vehicle or truck). However, it is also possible to implement the system according to the invention in a train, in a bicycle or the like.

It is pointed out that embodiments of the invention were described with reference to different subject matters of the invention. In particular, some embodiments of the invention are described using apparatus claims and other embodiments of the invention are described using method claims. However, it will become immediately clear to a person skilled in the art when reading this application that, unless explicitly specified otherwise, in addition to a combination of features belonging to one type of subject matter of the invention, any desired combination of features belonging to different types of subject matters of the invention is also possible.

Further advantages and features of the present invention emerge from the following exemplary description of currently preferred embodiments. The individual figures of the drawing of this application should only be considered to be schematic and should not be considered to be true to scale.

DESCRIPTION OF THE INVENTION

Figure 1:
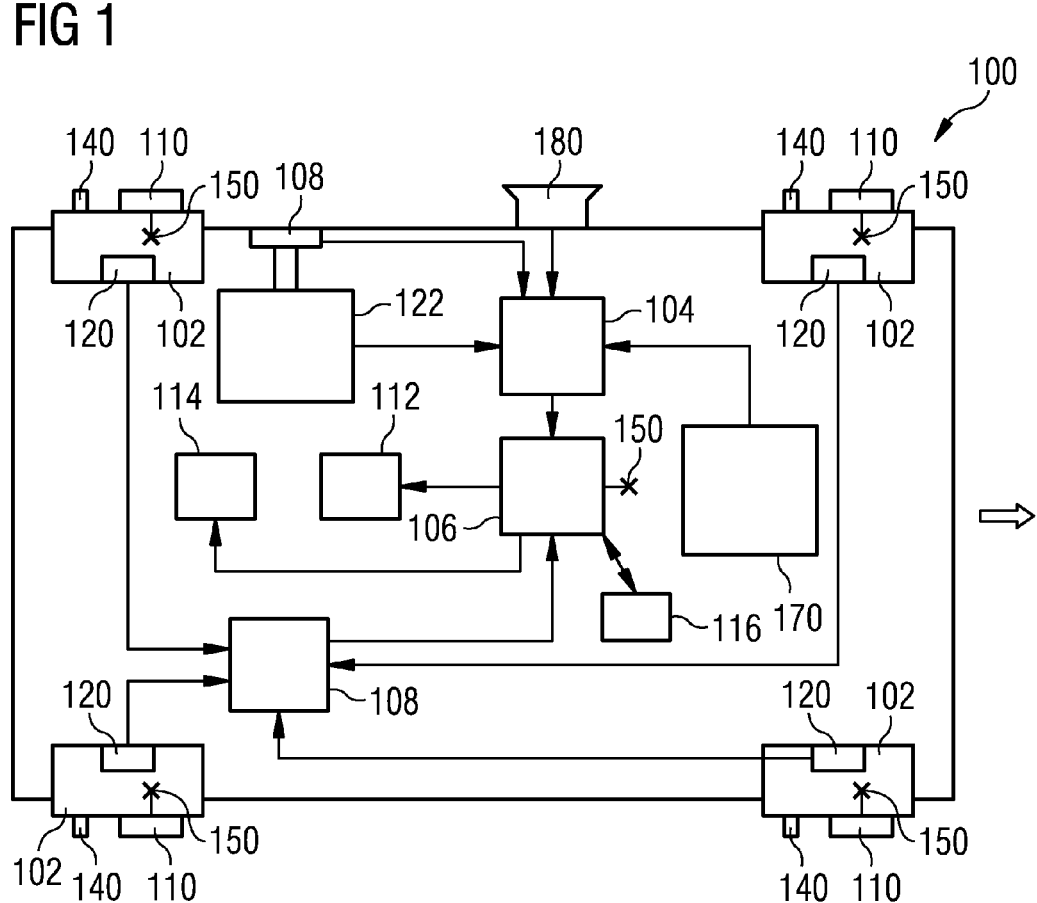
FIG. 1 shows a system for monitoring a filling level of a plurality of tires of a vehicle according to one exemplary embodiment of the invention.

Identical or similar components in different figures are provided with the same reference numerals.

Conventional tire pressure control systems make the driver aware of underfilled tires. However, the driver is not given any further assistance by the vehicle system when filling the tire, but rather is reliant on external aids and measuring devices.

According to one exemplary embodiment of the invention, it is possible to deliberately assist the driver when filling the tire using an existing tire pressure control system and to make additional external measuring devices superfluous or to improve their accuracy.

In one exemplary embodiment of the invention, steps include detecting the start condition, stipulating the order and controlling the filling operation by means of specific outputs/ notifications to the driver.

Start Condition:

The aim here is to detect a situation in which the driver can easily fill the tire or this has already begun anyway (so-called dP emissions). Suitable triggers may be, for example, the electronic unlocking of the tank flap or the switching-off of the vehicle after a pressure warning has been indicated or the knowledge that the vehicle is switched off at a filling station or the fact that the tank contents have fallen below 20%, for example, and the vehicle is switched off, etc. If the algorithm has recognized that there is or may be a filling situation, the filling assistant should be started.

Order:

This involves simulating the intuitive course of action of the driver during filling. For this purpose, it is possible to start at the closest wheel on the front left (on the front right in the case of right-hand-drive vehicles) and to continue the procedure in the clockwise direction around the vehicle (alternatively: in the counterclockwise direction). The starting position can be selected differently if there is a pressure problem at another location, which problem has also already been indicated to the driver, for example. For example, in certain scenarios, it would not be expedient to first of all start at the front left if a critical negative pressure at another location has already been indicated during the journey. The driver then intuitively expects to have to first of all fill the wheel with the negative pressure for which a warning has been given and will only then want to see to further wheels which may be slightly underfilled.

Filling Assistant:

During filling, the wheel electronics are preferably intended to transmit at an accelerated rate. An apparatus which, after the vehicle has been switched off (when the wheel electronics detect the absence of the rotational signal when coming out of the rotating state), causes the pressure to be measured at an increased repetition frequency (for example every 1 s or every 2 s or every 0.3 s) for a particular amount of time (for example 5 min, 10 min, 20 min) is required for this purpose in the wheel electronics. If filling is carried out during this time, the wheel electronics detect the pressure change in comparison with the previous measurement and change to an accelerated radio mode in which the pressure is measured and transmitted every 0.5 s or every 1 s or every 2 s, for example, until no further pressure change takes place (possibly a few seconds longer in order to allow short pauses during filling). The vehicle filling assistant processes this information (so-called dP messages) and signals to the driver whether filling should be continued, the target pressure has already been reached or the target pressure has already been exceeded and must be reduced again. Hysteresis may be advantageously applied (possibly in an asymmetrical manner) to the target pressure in the upward and downward directions in order to avoid toggling of the displays.

The driver can thus in turn be instructed when filling the tires which require pressure changes. The plausibility of the result can be checked for compliance with the legal limits and thresholds, for example, or for identical pressures per axle (within certain tolerances, for example 0.2 bar or 0.3 bar) or for identical load states (avoidance of partially loaded pressures at the front and fully loaded pressures at the rear). When the filling of one position is aborted (for example by driving off or filling another position), the function flexibly reacts to the driver actions and implements possibly correctly filled pressures in the system, while warnings are still possibly given for the positions which have not been filled or have not been correctly filled).

Output/Man-Machine Interface:

A vast range of approaches can be used for driver communication. For example, the turn signal lights as well as the entire interior lighting system or else the vehicle sound system, for example, are appropriate. In this case, lights can be used to indicate the position and the action can be coded by means of flashing: flashing means filling, glowing means the tire pressure is alright, and frantic flashing means letting out, for example. Loudspeakers can be used to output either signal tones or preferably voice instructions. Further means of communication may likewise be used (for example a mobile telephone, a radio key with a display, etc.).

One idea according to an exemplary embodiment of the invention is to intelligently detect a filling situation or a situation in which filling is expedient and possible. Furthermore, existing vehicle systems can be used in an optimum manner in order to assist the driver in an unfamiliar and uncommon situation. No system-related additional costs arise, but rather existing resources are synergistically concomitantly used.

FIG. 1 shows a vehicle 100 having an apparatus for monitoring a filling level of a plurality of tires 102 according to one exemplary embodiment of the invention.

Each of the tires 102 contains an associated tire pressure sensor 120 and a valve 140 which is provided with a filling or emptying device (not shown) for filling or letting out tire compressed air, that is to say for inflating or deflating the tire 102. In addition, each tire 102 is provided with a liquid crystal display 110 which is coupled in a wireless manner (alternatively in a wired manner) to a filling level adaptation assistant 106 to be described in more detail below. This is schematically symbolized in FIG. 1 by corresponding transceiving antennas 150.

The vehicle 100 has a number of vehicle resources which are only partially illustrated in FIG. 1, for example a tank cap 108, a tank 122, an engine 170, an interior lighting system 112 and a sound system 114. Furthermore, a camera 180 which can record environmental data is fitted to an external region of the motor vehicle 100.

The text below describes how a user, for example a driver or front-seat passenger of the vehicle 100, is assisted or instructed during an operation of filling and/or emptying the tires 102.

A situation detection unit 104, which is set up to detect a situation in which adaptation of a filling level of at least one of the tires 102 of the vehicle 100 can be expected, is first of all provided for this purpose. For this purpose, the situation detection unit 104 receives an input signal from the camera 180, indicative of the respective environment of the vehicle 100, for example indicative of a filling station stop. Furthermore, a sensor signal can be used to communicate to the situation detection unit 104 that a user has operated the tank cap 108 of the vehicle 100. The fact that the contents of the tank 122 have fallen below a predefinable threshold value, for example a reserve fill level, can also be communicated to the situation detection unit 104. If the engine 170 is switched off, a corresponding signal is likewise transmitted to the situation detection unit 104. The situation detection unit 104 can therefore use one or more of the described sensor signals and further sensor signals (not described) to draw the conclusion that filling and/or emptying of one of the tires 102 is imminent with a sufficient degree of probability.

If the situation detection unit 104 has detected such a scenario, it can activate a coupled filling level adaptation assistant 106, for example can switch on said assistant from a switched-off state or can wake said assistant from a sleep mode. The filling level adaptation assistant 106 is set up to automatically (that is to say without the user taking action) assist the user of the vehicle 100 during adaptation of the filling level of the at least one tire 102 when the presence of the filling or emptying situation is detected. In other words, the filling level adaptation assistant 106 can run an algorithm which can be used to intuitively guide the user through the filling or emptying operation without the need for external aids.

If a filling or emptying operation is present, the filling level adaptation assistant 106 can determine a tire pressure of at least one of the tires 102 in a shorter interval than usual. For example, a tire pressure can be detected as standard in order to inform the user if a tire pressure falls in an undesirable manner or rises excessively. However, during the filling or emptying operation, it may be advantageous for a user if the tire pressure is detected more frequently than in a standard situation. This is because the tire pressure can be expected to rise or fall in a considerably faster manner during filling or emptying than during normal operation of the vehicle. The filling level adaptation assistant 106 can inform the user, to be precise during filling or emptying, of the progress of this filling or emptying, for example. For this purpose, a current pressure in comparison with a desired pressure can be digitally displayed on the liquid crystal display 110 of the associated tire 102, for example. This makes it possible for a user to intuitively fill or empty the tire 102.

Alternatively or additionally, the filling level adaptation assistant 106 can also use vehicle resources, for example the interior lighting system 112 or the sound system 114, to indicate the progress of a filling or emptying operation, for example. For example, the interior lighting system 112 and/or the sound system 114 can thus initiate an optical and/or acoustic code, for example a pulsed signal during the need for filling, a permanent signal when a desired final pressure is reached and a signal which is pulsed at a higher frequency when a permissible maximum pressure is exceeded. Therefore, it is possible to use already existing vehicle resources, without having to provide additional equipment, in order to form a user-friendly filling level adaptation assistant 106.

The filling level adaptation assistant 106 can also be assisted by a filling sequence prediction unit 116. The latter may be set up to predict a probable filling sequence and to transmit the latter to the filling level adaptation assistant 106 as the basis for assistance. The filling sequence prediction unit 116 can thus reproduce, for example, a habit of a user of starting with the tire 102 closest to a driver's door of the vehicle 100 during filling. However, the filling sequence prediction unit 116 can make another prediction in a situation in which a user has previously been informed of an undesirable pressure in a particular tire of the tires 102. In this situation, it will be expected that the user will first of all attend to this tire 102 and will only then fill the remaining tires 102, if necessary.

A filling level detection unit 118 may receive the sensor signals from the pressure sensors 120 and may transmit the processed pressure values to the filling level monitoring assistant 106 as the basis for assistance.

Process sequences for operating a filling level adaptation assistant according to one exemplary embodiment of the invention are described below with reference to FIG. 2 to FIG. 5.

Figure 2:
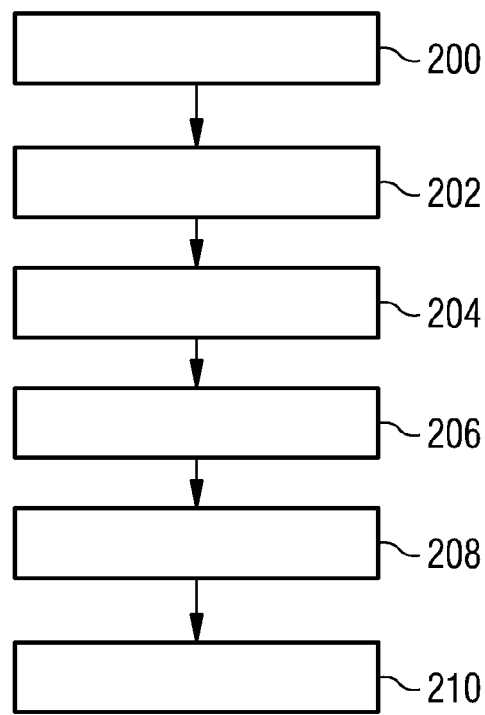
FIG. 2 to FIG. 5 show flowcharts of a method according to one exemplary embodiment of the invention.

FIG. 2 shows a sequence for clarifying prerequisites for starting. After an ignition has been switched on (see block 200), a block 202 enquires whether a loading state is ready. A block 204 enquires whether localization information is available. A block 206 enquires whether tire size information is available. A block 208 enquires whether tire pressures are available. The filling assistant is ready in a block 210.

Figure 3:
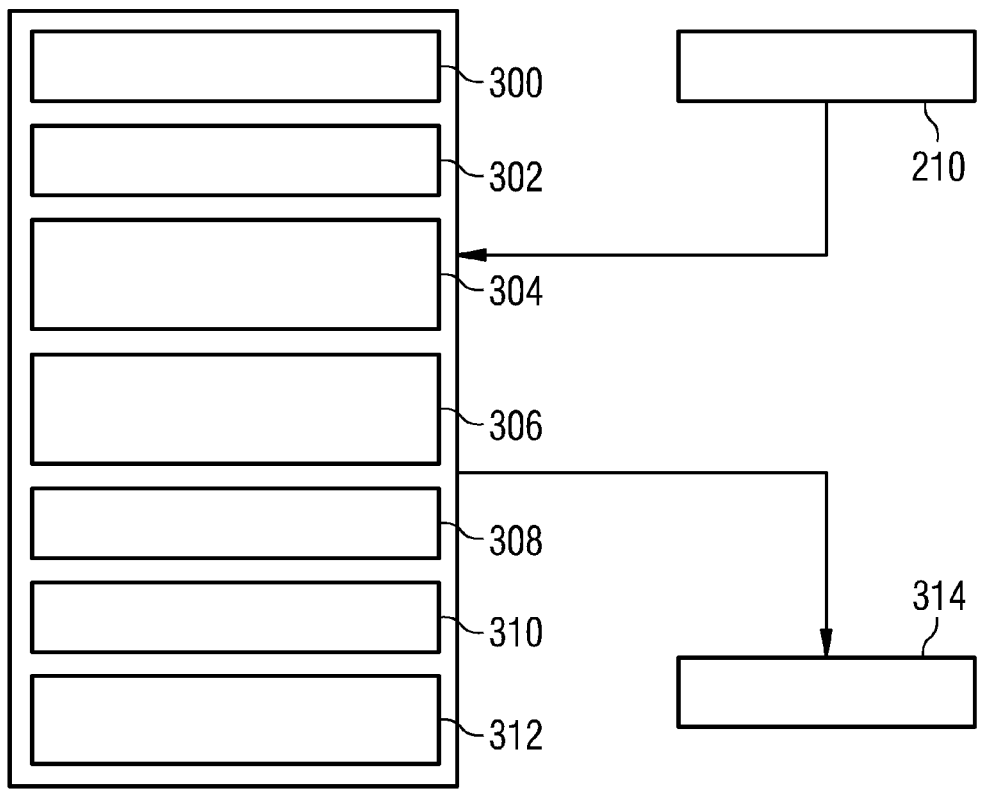

FIG. 3 shows a process flow which illustrates starting conditions for starting the filling assistant.

If the filling assistant is ready (see block 210), a number of criteria are checked in order to determine whether a filling situation could be currently present. A check is thus carried out in order to determine whether the fuel tank is unlocked/open (see block 300). A block 302 enquires whether the vehicle is stationary and a pressure difference (dP greater than zero) has been received. A block 304 checks whether the vehicle has stopped, the fuel tank is almost empty (less than 20%) and the ignition has been switched off. A block 306 checks whether the vehicle has stopped and a navigation device identifies a current position of the vehicle as a filling station. A block 308 checks whether the filling assistant has been manually started by a driver (in a menu). A block 310 checks whether the vehicle has stopped after a warning has been displayed, in particular a warning of excessively low tire pressure. A block 312 checks whether a pressure warning is already due for display with the ignition switched off and the vehicle has stopped. The filling assistant can then be started on the basis of one or more of the criteria in blocks 302, 304, 306, 308, 310, 312 (see block 314).

Figure 4:
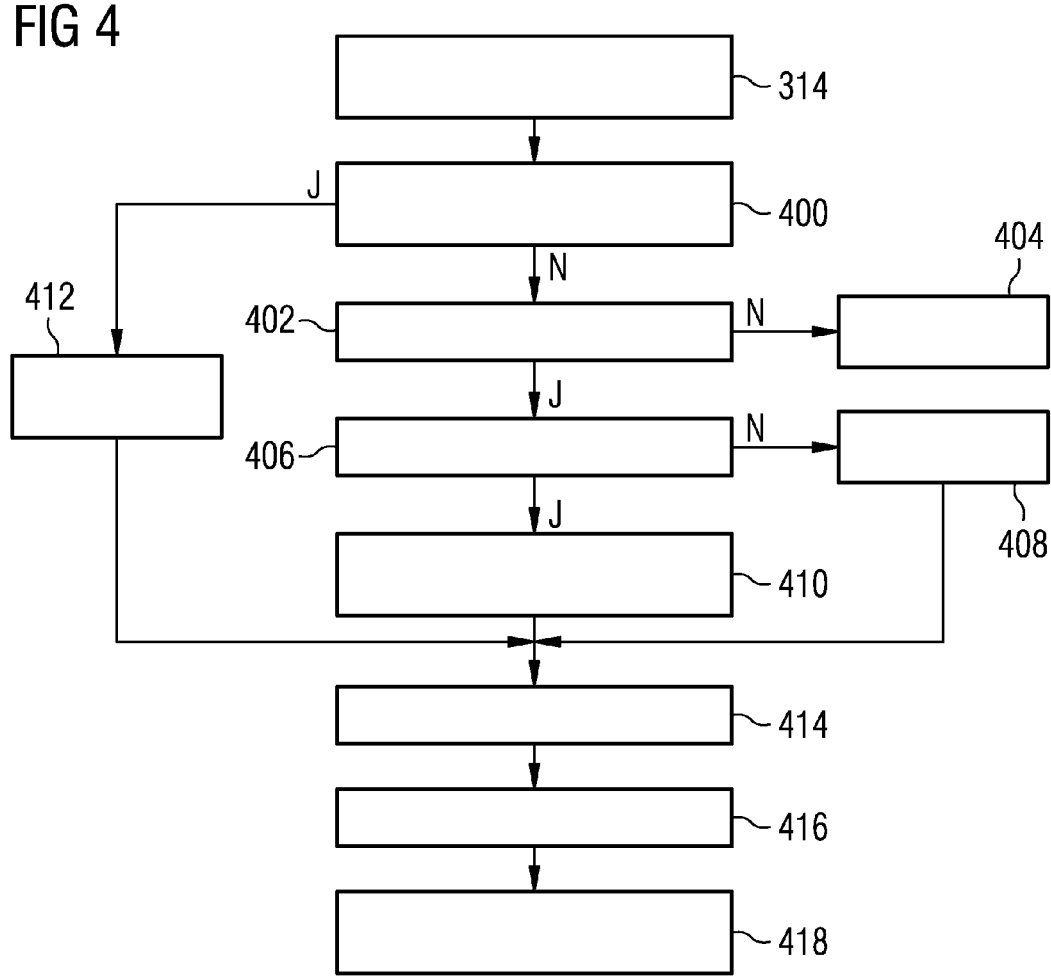

FIG. 4 shows a flowchart which shows the definition of the order for a filling procedure. After the filling assistant has been started (see block 314), a block 400 enquires whether a pressure discrepancy dP has been received. If not, a block 402 checks whether a measure is required. If not, the procedure is ended in a block 404. If so, a block 406 enquires whether there is a warning. If not, the operation begins with a left front tire position in a block 408. If so, the operation begins with a position which has the highest warning priority (see block 410). If the answer in block 400 is yes, the operation begins with the position with the pressure discrepancy (see block 412). Block 414 indicates that a filling position is then handled in the clockwise direction. Block 416 eliminates positions without necessary measures. Block 418 stipulates the order.

Figure 5:
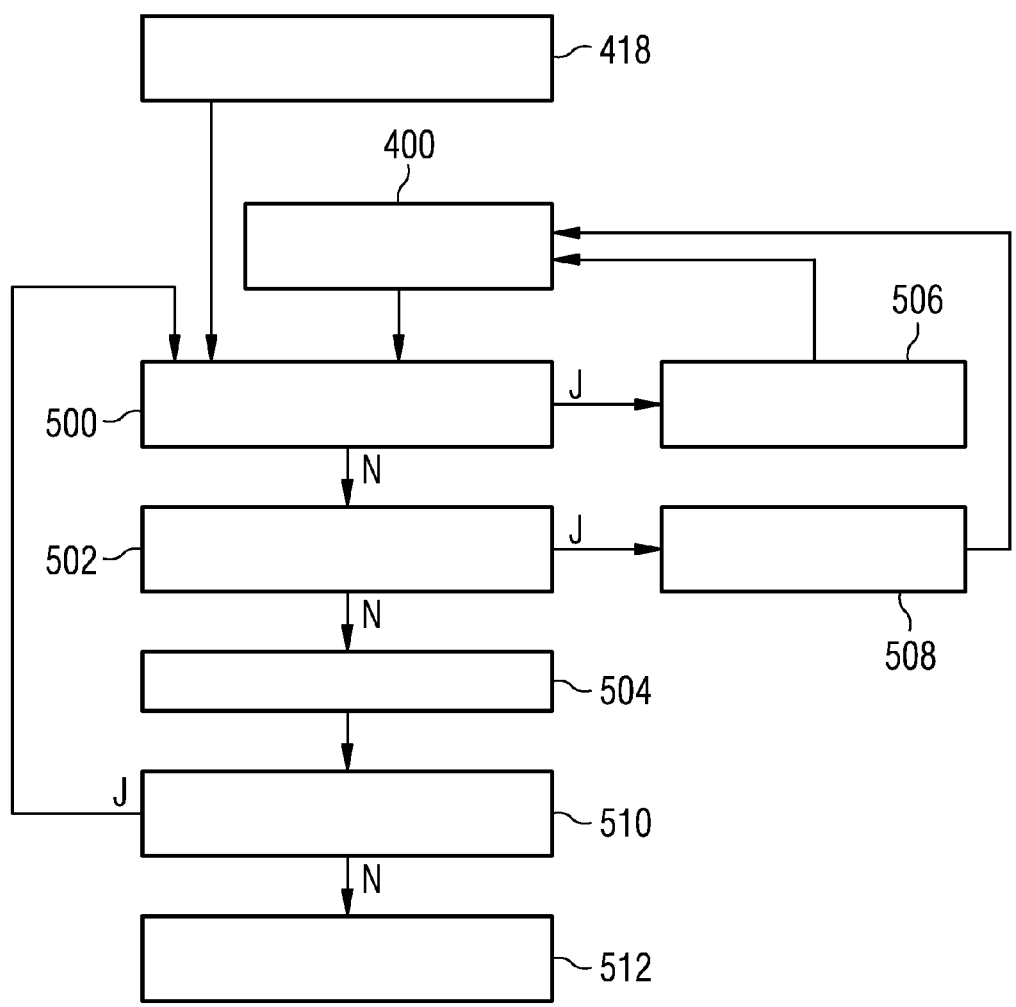

FIG. 5 shows the process flow during a filling procedure. If the order has been stipulated (see block 418), a block 500 checks whether the pressure discrepancy dP is less than RCP minus hysteresis. If not (see block 502), a check is carried out in order to determine whether the pressure discrepancy dP is greater than RCP plus hysteresis. If not, "stop" is displayed on a man-machine interface (see block 504). If the answer in block 500 is yes, a pressure increase is requested on the man-machine interface (see block 506). If the answer in block 502 was yes, the requirement for a lower pressure is displayed on the man-machine interface (see block 508).

Block 504 is followed by a block 510 which checks whether there is a need for a measure for a further tire. If so, the procedure is continued with block 500. If not, the filling assistant is ended in block 512.

Vehicle resources which can be concomitantly used for the filling assistant are preferably turn signals, mirror lights, headlights or tail lights, interior lights, "Welcome home" lights, loudspeakers of the sound system. Further vehicle resources which can be used are a mobile telephone using SMS or Bluetooth, a display or the horn. It is likewise conceivable to use a central locking system, window winders or electrically retractable side mirrors.

It is pointed out that the embodiments described here represent only a limited number of possible embodiment variants of the invention. It is thus possible to combine the features of individual embodiments with one another in a suitable manner, with the result that a multiplicity of different embodiments can be considered to be obviously disclosed to a person skilled in the art with the explicit embodiment variants here.

The invention claimed is:

1. An apparatus for monitoring a filling level of a plurality of tires of a vehicle, the apparatus comprising:
    a situation detection unit configured to detect a situation in which an adaptation of the filling level of at least one of the tires of the vehicle is to be expected; and
    a filling level adaptation assistant configured to receive from said situation detection unit a signal indicating that a presence of the situation is detected and configured to automatically assist a user of the vehicle during adaptation of the filling level of the at least one tire when the presence of the situation is detected;
    said filling level adaptation assistant being configured to increase a repetition interval for detecting a tire pressure of at least one of the tires when the presence of the situation is detected.

2. The apparatus according to claim 1, wherein said situation detection unit and said filling level adaptation assistant are components of vehicle electronics.

3. The apparatus according to claim 1, wherein said situation detection unit is configured to detect a situation as a situation in which adaptation of a filling level of at least one of the tires of the vehicle can be expected if at least one of the following criteria is met:

detection of an unlocking of a tank flap;
   detection of a switching-off of the vehicle after the user of the vehicle has previously been informed that the filling level of at least one of the tires should be adapted;
   detection of a switching-off of the vehicle at a filling station; and
   detection of a switching-off of the vehicle after a fuel level in a tank of the vehicle has fallen below a preset threshold value.

4. The apparatus according to claim 1, wherein said situation detection unit is configured to activate said filling level adaptation assistant when the situation is detected.

5. The apparatus according to claim 1, wherein said filling level adaptation assistant is configured to indicate to the user whether filling or emptying should be continued for a particular tire when the presence of the situation is detected.

6. The apparatus according to claim 1, which comprises a man-machine interface configured to indicate an item of assistance information from said filling level adaptation assistant to the user.

7. The apparatus according to claim 6, wherein said man-machine interface is configured to convey the information to the user optically and/or acoustically.

8. The apparatus according to claim 1, wherein said filling level adaptation assistant is configured to drive a vehicle resource in order to indicate an item of assistance information from the filling level adaptation assistant to the user.

9. The apparatus according to claim 8, wherein the vehicle resource to be driven by said filling level adaptation assistant includes at least one device selected from the group consisting of a passenger compartment illumination unit and a sound system.

10. The apparatus according to claim 1, which comprises a filling sequence prediction unit configured to predict a probable filling sequence and to transmit the sequence to the filling level adaptation assistant as a basis for assistance.

11. The apparatus according to claim 10, wherein said filling sequence prediction unit is configured to predict the probable filling sequence on the basis of at least one of the following assumptions of a behavior of the user:
    start of the filling sequence at a tire spatially closest to a driver's door of the vehicle;
    start of the filling sequence at a tire for which the user was previously informed that the filling level of the respective tire should be adapted;
    progress of the filling sequence in the clockwise direction around the vehicle; and
    filling sequence in accordance with one or more filling sequences carried out by the user in the past.

12. The apparatus according to claim 1, which comprises a filling level detection unit having a plurality of sensors mounted to the tires of the vehicle and configured to determine a tire pressure for each of the tires.

13. A vehicle, comprising an apparatus for monitoring a filling level of a plurality of tires of the vehicle according to claim 1.

14. The apparatus according to claim 1, wherein said filling level adaptation assistant is configured to be activated by the signal from said situation detection unit and in response to the activation to automatically assist a user of the vehicle during adaptation of the filling level of the at least one tire when the presence of the situation is detected.

15. A method for monitoring a filling level of a plurality of tires of a vehicle, the method which comprises:
    with a situation detection unit, detecting a situation in which adaptation of the filling level of at least one of the tires of the vehicle can be expected;

with the situation detection unit, automatically assisting a user of the vehicle during adaptation of the filling level of the at least one tire when the presence of the situation is detected; and with a filling level adaptation assistant, increasing a repetition interval for detecting a tire pressure of at least one of the tires when the presence of the situation is detected.

16. A computer-readable storage medium having stored thereon in non-transitory form a program for monitoring a filling level of a plurality of tires of a vehicle, wherein the program is configured to carry out or control the method according to claim 15.

17. The method according to claim 15, which further comprises: activating the filling level adaptation assistant by a signal from the situation detection unit and in response to the activation, automatically assisting a user of the vehicle during adaptation of the filling level of the at least one tire when the presence of the situation is detected.

* * * * *